(12) United States Patent
Amarendra et al.

(10) Patent No.: US 10,949,150 B2
(45) Date of Patent: Mar. 16, 2021

(54) PRINT JOB RESUMPTION USING ALTERNATE NETWORK INTERFACES

(71) Applicant: Hewlett-Packard Development Company, L.P., Spring, TX (US)

(72) Inventors: Shakti Amarendra, Bangalore (IN); Krishnaswamy R, Bangalore (IN); Anuradha Asuri, Bangalore (IN); Sivakami Velusamy, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/331,281

(22) PCT Filed: Jul. 24, 2017

(86) PCT No.: PCT/US2017/043444
§ 371 (c)(1),
(2) Date: Mar. 7, 2019

(87) PCT Pub. No.: WO2018/057098
PCT Pub. Date: Mar. 29, 2018

(65) Prior Publication Data
US 2019/0354329 A1    Nov. 21, 2019

(30) Foreign Application Priority Data

Sep. 20, 2016  (IN) .............................. 201641032114

(51) Int. Cl.
*G06F 3/12* (2006.01)
(52) U.S. Cl.
CPC .......... *G06F 3/1261* (2013.01); *G06F 3/1226* (2013.01); *G06F 3/1236* (2013.01); *G06F 3/1285* (2013.01); *G06F 3/1292* (2013.01)

(58) Field of Classification Search
CPC .... G06F 3/1261; G06F 3/1226; G06F 3/1236; G06F 3/1285; G06F 3/1292
USPC .......................................... 358/1.1–1.18, 402
See application file for complete search history.

(56) References Cited

U.S. PATENT DOCUMENTS

| | | | |
|---|---|---|---|
| 9,992,039 B2* | 6/2018 | Anandan | H04L 45/22 |
| 2005/0034001 A1* | 2/2005 | Pontarelli | H04W 52/0251 |
| | | | 713/320 |
| 2005/0141014 A1 | 6/2005 | Kikuchi et al. | |
| 2007/0146772 A1 | 6/2007 | Castellani | |
| 2009/0138878 A1 | 5/2009 | Fernstrom et al. | |

(Continued)

OTHER PUBLICATIONS

Ledru—Smart Proxies for Jini Services—ACM Sigplan Notices ~ Apr. 2002 ~ 5 pages.

*Primary Examiner* — Gabriel I Garcia
(74) *Attorney, Agent, or Firm* — HP Inc. Patent Department

(57) ABSTRACT

In one example, a printing device is disclosed, in which a network detection unit may discover available network interfaces associated with a client device upon detecting a printer network interface on which a print job is being received is down, a communication unit may send a link status notification to the client device via the available network interfaces associated with the client device, and a network switching unit may resume the print job using an alternate printer network interface that is accessible by the client device based on the link status notification.

15 Claims, 6 Drawing Sheets

(56) References Cited

U.S. PATENT DOCUMENTS

2011/0153815 A1* 6/2011 Aoki .................. H04L 61/2046
709/224
2014/0002851 A1  1/2014 Smith et al.
2014/0111825 A1  4/2014 Su
2016/0291904 A1 10/2016 Fukushima

* cited by examiner

PRINT JOB RESUMPTION USING ALTERNATE NETWORK INTERFACES

BACKGROUND

In a networked environment, electronic devices including personal computers, tablet computers, and smart phones may be connected to printing devices through different wired or wireless networks, so as to transmit files to the printing devices and print the files. Example wired network may include a universal serial bus (USB), Ethernet, and the like and wireless network may include Wi-Fi, a Bluetooth interface, Near Field Communication (NFC), and the like.

BRIEF DESCRIPTION OF THE DRAWINGS

Examples are described in the following detailed description and in reference to the drawings, in which.

DETAILED DESCRIPTION

Figure 1:
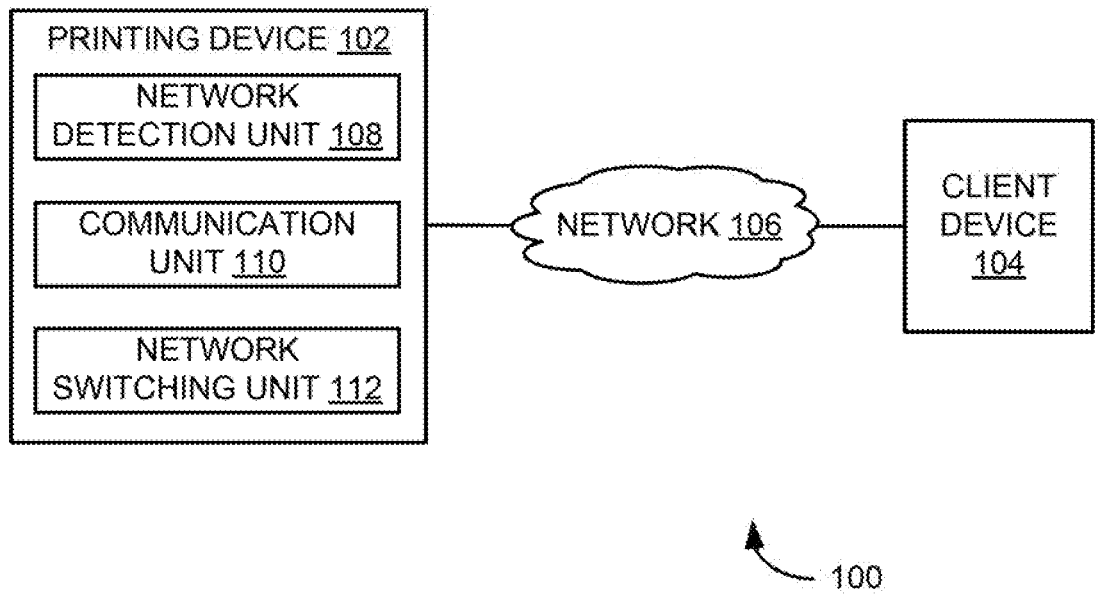
FIG. 1 is a block diagram of an example network environment including a client device and a printing device.

In a networked environment, electronic devices including personal computers, tablet computers, and smart phones may be connected to printing devices through different transmission control protocol/Internet protocol (TCP/IP) based wired or wireless networks, so as to transmit files to the printing devices and print the files. Example TCP/IP based wired or wireless network may include Internet, a universal serial bus (USB), Ethernet, a Bluetooth interface, or any other wireless connection or cable connection that uses IP address or mutually acceptable address for communication.

An electronic device can be connected via any of these wired or wireless network interfaces with the printing device. However, once the electronic device has connected to the printing device over one network interface, remaining network interfaces may become redundant for the electronic device. Therefore, the communication between the electronic device and the printer may fail when the connected network interface becomes inaccessible due to any reason. It results in job aborts leading to bad end-user experience. Some print client applications may support a retry mechanism to connect to a printing device. The terms "printer" and "printing device" are used interchangeably throughout the document.

Examples described herein may enable a printing device to discover available network interfaces of a client device on which the printing device can reach out to the client device. Further, examples described herein may enable the printing device to notify the client device to connect to the printing device using alternate network interfaces.

In one example, a client device may register network addresses (e.g., IP addresses or mutually acceptable addresses) associated with each of the client device's available network interfaces with a printing device upon triggering the print job via the printer network interface. The printing device may detect the printer network interface on which the print job is being received is down. The printing device may discover the available network interfaces associated with the client device upon detecting that the printer network interface on which the print job is being received is down.

The printing device may send a link status notification to the available network interfaces associated with the client device. Example link status notification may include a link status of each of available printer network interfaces associated with the printing device. Furthermore, the printing device may enable the client device to connect to the printing device using an alternate printer network interface that is accessible by the client device using the link status notification. The client device may be enabled to resume the print job using the alternate printer network interface.

Examples described herein ray provide an improved end-user experience by maintaining printer-client connections across network faults. Examples described herein can be implemented irrespective of the client device and the printing device being in the same subnet or a different subnet.

Turning now to the figures, FIG. 1 is a block diagram of an example network environment 100 including a client device 104 communicatively coupled to a printing device 102. Example network environment 100 of FIG. 1 is illustrated using one client device and one printing device, however, network environment 100 may include multiple printing devices and multiple client devices, such that each printing device may be shared by corresponding client devices. For example, a printing device may be shared by a set of client devices using a corresponding printer driver that is either installed in or accessible to the set of client devices.

Examples of client device 104 may include, but not limited to, a cellular phone, a laptop, a desktop, a mainframe computer, a smartphone, a personal digital assistant (PDA), an Internet of Things (IoT) device and other devices capable of giving a print job for printing. The term "printing device" may refer to any image forming apparatus that accepts print jobs from client devices and store the print jobs in a print job queue for printing. Example printing device may be a multi-functional device capable of performing print, copy, scan, fax, and the like. Client device 104 may be communicatively coupled to printing device 102 via a network 106. Example network 106 may include a local area network, a wireless network, a wide area network, a peer-to-peer network, or a hard-wired connection.

Figure 2:
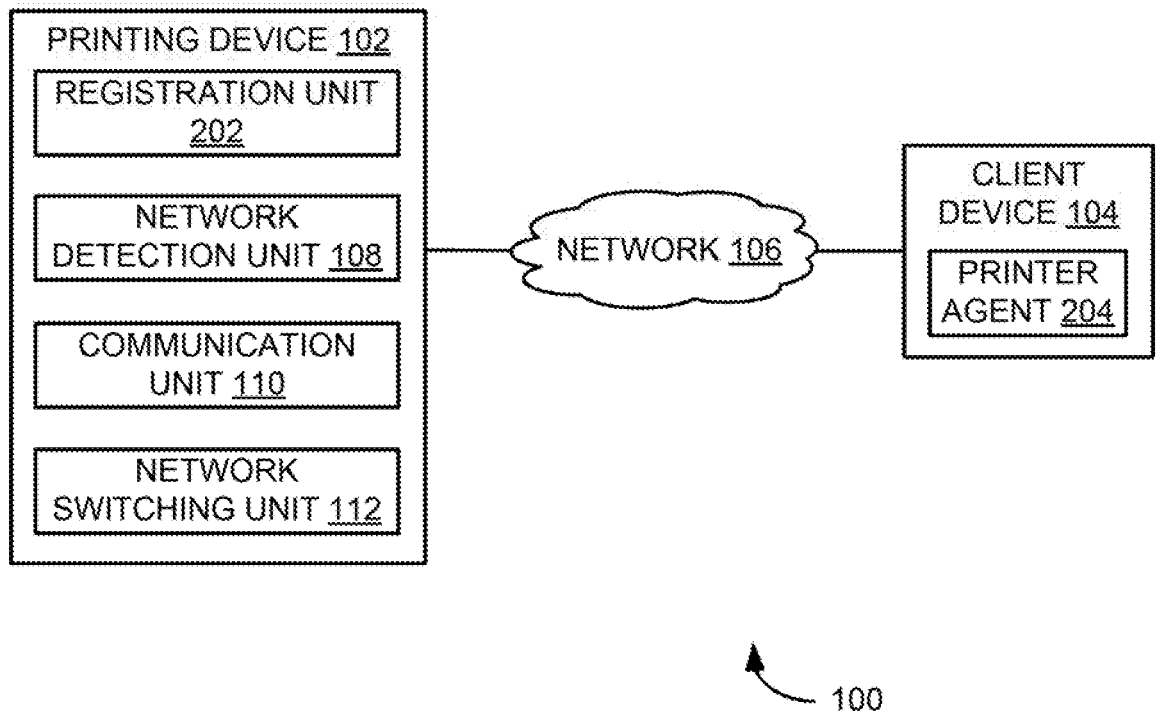
FIG. 2 is a block diagram of the example network environment of FIG. 1 illustrating additional components.

Printing device 102 may include a network detection unit 108, a communication unit 110, a network switching unit 112. FIG. 2 is a block diagram of the example network environment 100 of FIG. 1 illustrating additional components. As shown in FIG. 2, printing device 102 may include a registration unit 202 and client device 104 may include a printer agent 204, for instance, residing in memory of client device 104. Printer agent 204 may be a printer driver that is either installed in or accessible to client device 104 to access printing device 102.

During operation, registration unit 202 may enable client device 104 to register network addresses associated with each of the available network interfaces of client device 104 when the print job is received via a printer network interface. For example, each available network interface associated with client device 104 may include a wired network or a wireless network that uses a network address for communication. Example network address may include an Internet protocol (IP) address or any other mutually acceptable/supported address.

In one example, printer agent 204 may create a subscription (e.g., callback mechanism) to receive link status notifications from printing device 102, when sending the print job. As part of the subscription, printer agent 204 may specify/register a uniform resource locator (URL) for each of the client device's available network interfaces to receive the link status notifications. For example, if client device 104 has two network addresses, the link status notification recipient. URLs may be provided as below:

http://<Client IP address 1>/ipp/notification/ . . .
http://<Client IP address 2>/ipp/notification/ . . .

Network detection unit 108 may discover the available network interfaces associated with client device 104 upon detecting that the printer network interface on which the print job is being received is down. In one example, network detection unit 108 may discover the registered available network interfaces associated with client device 104 upon detecting that the printer network interface is down. For example, after a connection has been established between printing device 102 and client device 104, the connection may be down, for instance, due to bad data, packet lost, data is not ready, network delay, and/or network down.

In one example, to detect whether the printer network interface on which the print job is being received is down or not, out of the stipulated X minutes of time-out before the printer network interface is deemed to be broken, printing device 102 may wait for Y minutes (where Y<X) and then may probe the specific network link state to check if the printer network interface is working. X and Y may be user-defined values or specific to printing device 102. Further, printing device 102 may notify client device 104 about the impending link breakdown substantially before the time-out state is reached for the printer network interface.

Communication unit 110 may send a link status notification to client device 104 via the registered available network interfaces associated with client device 104. Example link status notification may include a link status of each of available printer network interfaces associated with printing device 102. In one example, each available printer network interface may include a wired network or a wireless network that uses a network address (e.g., IP address or any other mutually acceptable/supported address) for communication.

In one example, a structure of the link status notification message may be defined in Internet printing protocol (IPP) standard. Examples described herein may add a printer event for the link status of each of the printing device's network interfaces. When printing device 102 detects that the printer network interface link on which printing device 102 is receiving the print job is down, printing device 102 may send a printer link status event/notification to the registered notification recipients. The link status notification may have a sequence of following attributes for each interface:

```
Link Status Event
{
    Link Type: - <Text format:- Ethernet, WLAN etc>
    Link IP address: - <Printer IP address 1, 2, 3 etc.>
    Link State: - <Up/Down>
}
```

For example, if printing device 102 has three different network interfaces e.g. 3 different IP addresses, each of the 3 network interfaces may have their oven link states. For example, the link state notification may have the following attributes:

```
{
    {
        Link Type: - Embedded Ethernet
        Link IP address: - Printer Ethernet IP address
        Link State: - Down
    }
    {
        Link Type: - WLAN STA
        Link IP address: - Printer WLAN IP address
        Link State: - Up
    }
    {
        Link Type: - WLAN AP
        Link IP address: - Printer WLAN AP IP address
        Link State: - Up
    }
}
```

Figure 3A:
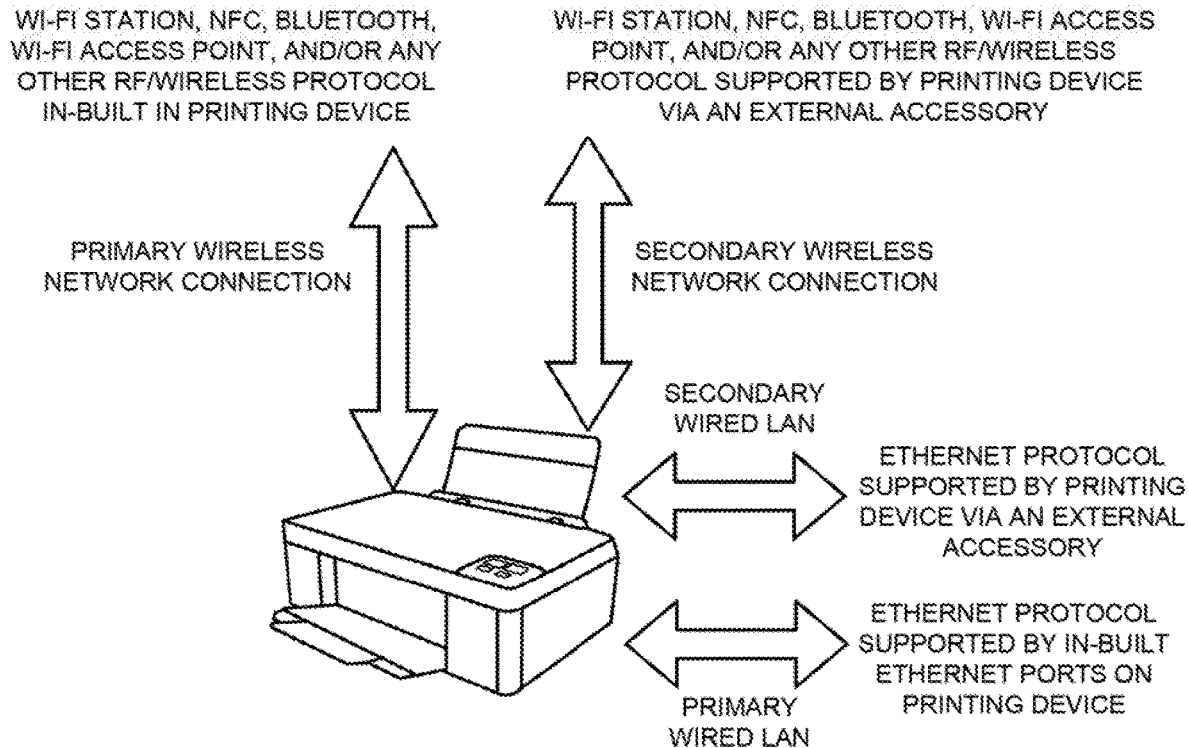
FIG. 3A is an example scenario illustrating multitude of network interfaces available on printing devices.

An example printing device having multiple network interfaces is shown in FIG. 3A. FIG. 3A is an example scenario 300A illustrating multitude of network interfaces available on printing device, for instance, printing device 102 of FIGS. 1 and 2. Printing device can have multiple network interfaces, e.g., wired connections such as Ethernet. USB and the like, or wireless connections such as Wi-Fi, Bluetooth, NFC, and the like. FIG. 3A shows some of the wired and wireless network connections that use IP addresses or mutually acceptable addresses for communication.

In the example shown in FIG. 3A, the printing device may include a primary wireless network connection such as Wi-Fi station, NFC, Bluetooth, Wi-Fi access point and/or any other radio frequency (RF)/wireless protocol that can be in-built in the printing device. Further, the printing device may include a secondary wireless network connection such as Wi-Fi station, NFC, Bluetooth, Wi-Fi access point and/or any other RF/wireless protocol that can be supported by the printing device via an external accessory (e.g., connected to the printing device via USB, Peripheral Component Interconnect (PCI) and the like). Also as shown in FIG. 3A, the printing device may include a primary wired local area network (LAN) such as Ethernet protocol supported by in-built Ethernet ports on the printing device and secondary wired LAN connection such as Ethernet protocol supported by the printing device via an external accessory (e.g., connected to the printing device via USB, PCI and the like). For example, a client device can be connected to any of these wired or wireless network interfaces to use the printing device.

Referring to FIGS. 1 and 2, network switching unit 112 may resume the print job using an alternate printer network interface that is accessible by client device 104 based on the link status notification. In one example, network switching unit 112 may resume the print job using the alternate printer network interface upon selecting the alternate printer network interface by printer agent 204 residing in client device 104. In this case, printer agent 204 may be enabled to select the alternate printer network interface that is accessible by client device 104 based on the link status of each of the available printer network interfaces. Network switching unit 112 may enable printer agent 204 to resume the print job using the selected alternate printer network interface that is accessible by client device 104.

In one example, when client device 104/printer agent 204 receives the link status notification on any of the subscribed recipient URLs, and when printer agent 204 finds that the printer network interface (e.g., IP address) to which client device 104 is currently communicating is down, then printer agent 204 may resume communication with printing device 102 on a reachable alternate active printer network interface. Thus, communication between printing device 102 and client device 104 may continue over another working network interface of printing device 102 and client device 104. In another example, when multiple alternate printer network interfaces are available for printing device 102, then the alternate printer network interface for resuming the print job may be selected based on a predefined priority order.

In one example, when multiple alternative network interfaces are available for printing device 102 and client device 104 to communicate, the descending priority order for choosing the network interface to resume communication between printing device 102 and client device 104 can be dynamically decided based on the following criteria of decreasing reliability:

1. Any other embedded Ethernet interface,
2. Any other Ethernet interface via attached accessories as accessories can be removed and hence are relatively less reliable than embedded Ethernet connectivity,
3. Any other wired interface like IP over USB, Firewire (1394) and the like. When there are multiple such interfaces available, an interface having least number of already active TCP connections may be selected, thus ensuring better data throughput,
4. Any Wi-Fi station interface. When there are multiple such interfaces available, an interface may be selected based on following parameters for ensuring better data throughput:
    a. having better signal strength reception, and
    b. having least number of already active TCP connections, and
5. Any other wireless interfaces like Bluetooth, ZigBee, Cellular network and the like, which support TCP/IP protocol.

Figure 3B:
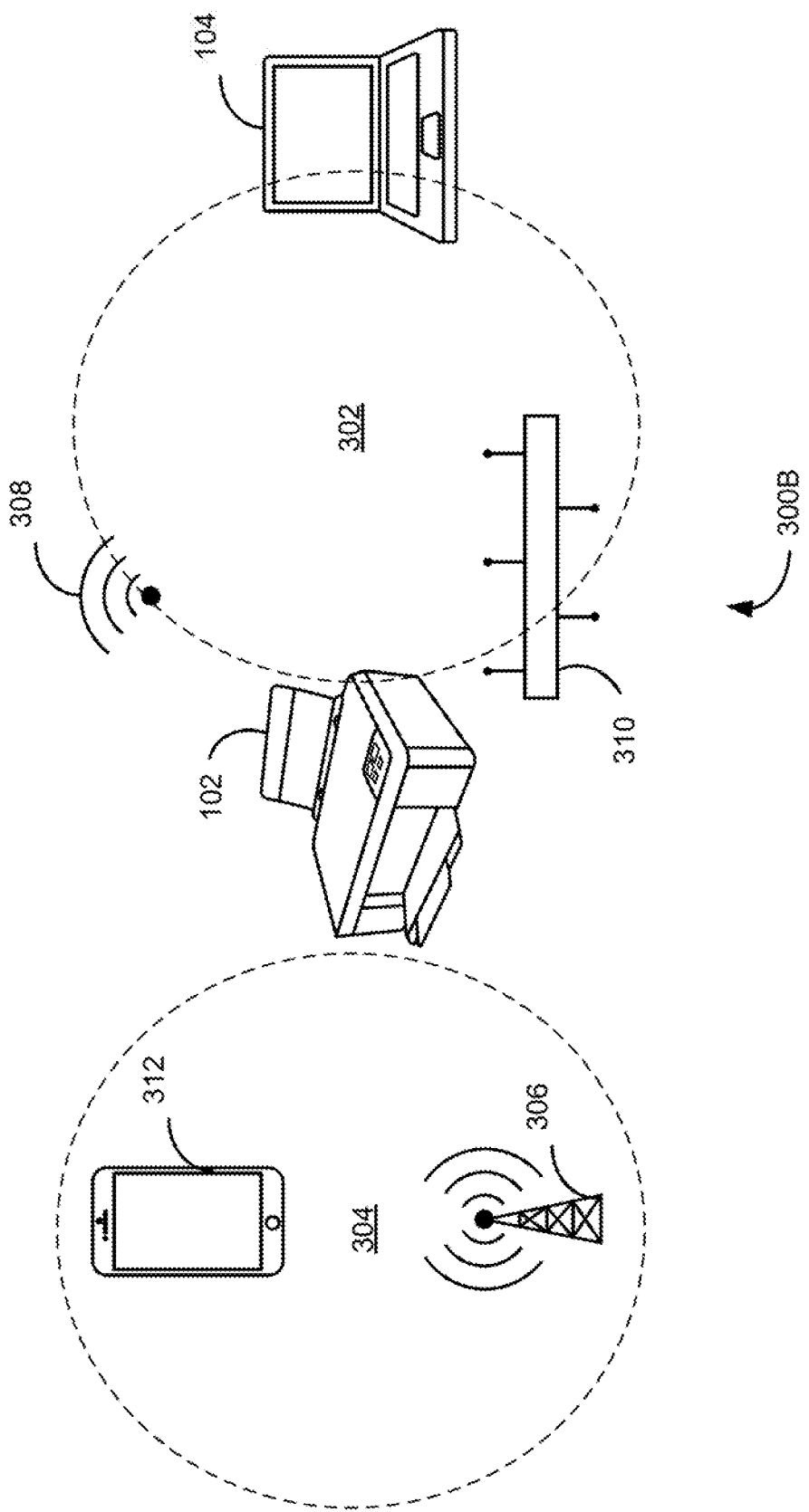
FIG. 3B is an example scenario illustrating printer network interfaces and subnet formation.

The priority order may be defined based on best possible speed and a similar experience to that of the printer network interface which was broken. Examples described herein may work independent of active and inactive network interfaces of printing device 102 being in same or different subnets. FIG. 3B is an example scenario 300B illustrating printer network interfaces and subnet formation. Examples described in FIGS. 1 and 2 may address fault-tolerant print connectivity when the network addresses of the printer network interfaces are in the same or different subnets. For example, network interfaces that belong to a subnet are addressed with a common, identical, most-significant bit-group in their IP address.

The network interfaces of printing device 102 can span across subnets as shown in FIG. 3B. FIG. 3B shows subnets 302 and 304. In the example shown in FIG. 3B, smartphone 312 and Wi-Fi wireless interface 306 of printing device 102 may form one subnet (e.g., 304). Further in the example shown in FIG. 3B, Wi-Fi wireless interface 306 of printing device 102 may form a different subnet which might be accessible to guest users. Further, printing device's Wi-Fi station 308 and Ethernet interfaces 310 may be part of the same subnet (e.g., subnet 302), for example, allowing client device 104 in an organization to connect to printing device 102 via any of the interfaces (i.e., Wi-Fi station 308 and Ethernet interfaces 310). Similarly, client device 104 can support multiple networking interfaces. FIG. 3B is described using example printer network interfaces and subnet formation, however, multitude of scenarios can be possible based on a network topology of different networking interfaces between printing device 102 and client device 104.

In one example, the components of client device 104 and printing device 102 may be implemented in hardware, machine-readable instructions or a combination thereof. In one example, printer agent 204 of client device 104 and registration unit 202 network detection unit 108, communication unit 110, and network switching unit 112 of printing device 102 may be implemented as engines or modules comprising any combination of hardware and programming to implement the functionalities described herein. Even though FIGS. 1 and 2 describe about client device 104, the functionality of the components of client device 104 may be implemented in other electronic devices such as personal computers (PCs), server computers, tablet computers, mobile devices and the like.

Client device 104 and printing device 102 may include computer-readable storage medium comprising (e.g., encoded with) instructions executable by a processor to implement functionalities described herein in relation to FIGS. 1-3. In some examples, the functionalities described herein, in relation to instructions to implement functions of components of client device 104 and printing device 102 and any additional instructions described herein in relation to the storage medium, may be implemented as engines or modules comprising any combination of hardware and programming to implement the functionalities of the modules or engines described herein. The functions of components of client device 104 and printing device 102 may also be implemented by the processor. In examples described herein, the processor may include, for example, one processor or multiple processors included in a single device or distributed across multiple devices.

Figure 4:
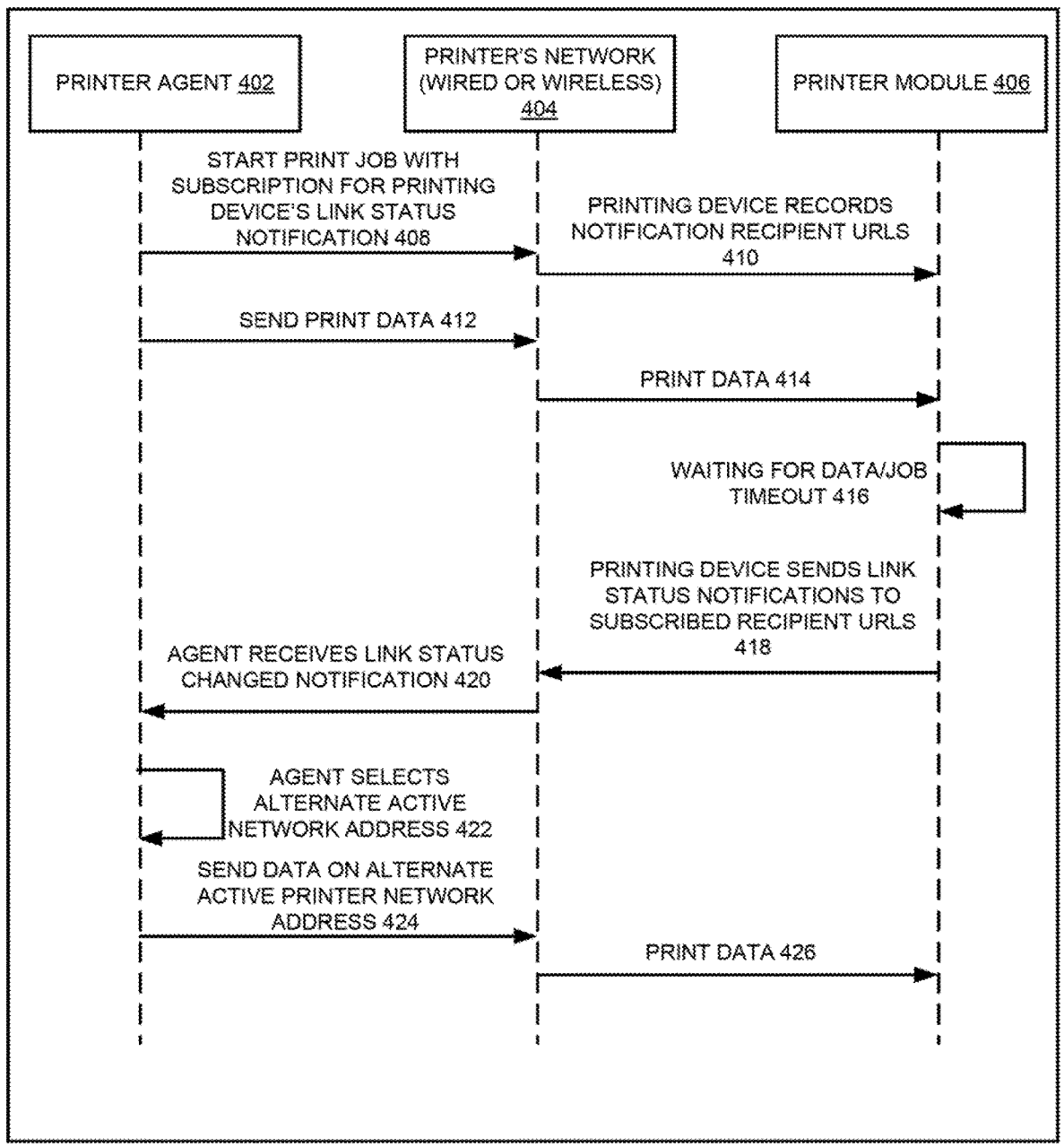
FIG. 4 depicts an example timeline diagram showing sequence of operations between a printing device and a client device to resume a print job using an alternate printer network interface.

Referring to FIG. 4, which depicts an example timeline diagram 400 showing sequence of operations between a printing device and a client device to resume a print job using an alternate printer network interface. At 408, a printer agent 402 residing in client device may start/trigger print job with subscription for printing device's link status notification via printing device's wired or wireless network 404 (e.g., a first printer network interface). In one example, printer agent 402 may create a subscription (e.g., callback mechanism) to receive link status notifications from the printing device, when sending the print job. As part of the subscription, printer agent 402 may specify/register an URL for each of the available network interfaces to receive the link status notifications from the printing device. For example, each URL may be defined using an IP address or any other mutually acceptable/supported address.

At 410, printer module 406 residing in the printing device may record/register network addresses (e.g., notification recipient URLs) associated with each of the available network interfaces of the client device. At 412, printer agent 402 may send print data for executing the print via the printing device's network 404 (i.e., the first printer network interface). At 414, printer module 406 may receive the print data via the printer's network 404 (i.e., the first printer network interface). At 416, printer module 406 may wait for a predefined time-out period associated with the print job to detect whether the first printer network interface is down.

At 418, printer module 406 may send link status notifications to subscribed/registered network addresses (e.g., notification recipient URLs). Example link status notification may include a link status of each of available printer network interfaces associated with the printing device. At 420, printer agent 402 may receive link status changed notification from the printing device. At 422, printer agent 402 may select an alternate active printer network interface (e.g., alternate network address such as IP address) that is accessible by the client device to connect to the printing device using the link status notifications. At 424, printer agent 402 may send the print data to the printing device on the alternate active printer network interface (i.e., alternate network address). At 426, printer module 406 may receive the print data and resume the print job using the alternate active printer network interface.

Figure 5:
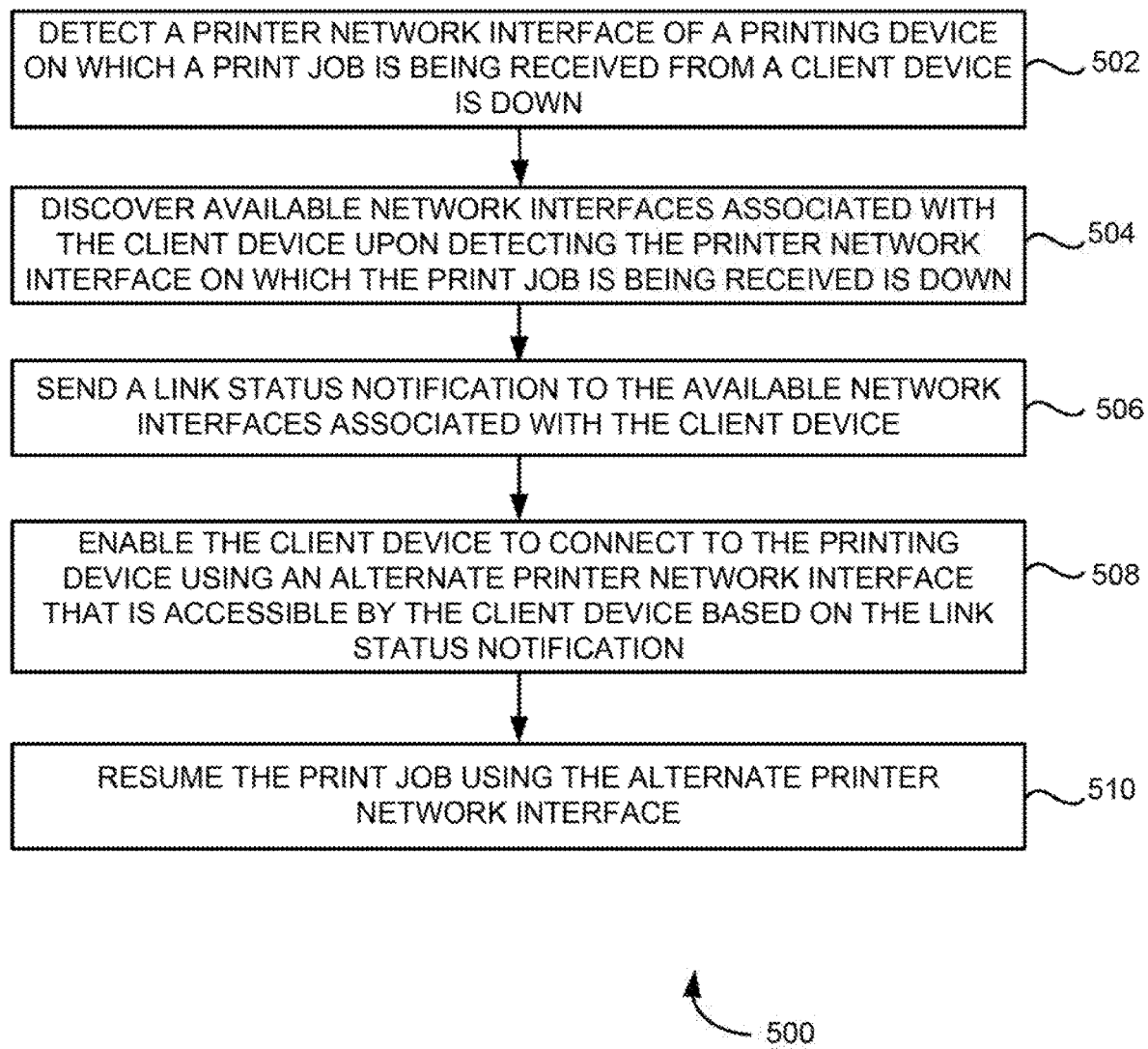
FIG. 5 depicts an example flow chart to send a link status notification to a client device and resume a print job using an alternate printer network interface.

FIG. 5 depicts an example flow chart 500 to send a link status notification to a client device and resume a print job using an alternate printer network interface. It should be understood the process depicted in FIG. 5 may represent generalized illustrations, and that other processes may be added or existing processes may be removed, modified, or rearranged without departing from the scope and spirit of the present application. In addition, it should be understood that the processes may represent instructions stored on a computer readable storage medium that, when executed, may cause a processor to respond, to perform actions, to change states, and/or to make decisions. Alternatively, the processes may represent functions and/or actions perforated by functionally equivalent circuits like analog circuits, digital signal processing circuits, application specific integrated circuits (ASICs), or other hardware components associated with the system. Furthermore, the flow charts are not intended to limit the implementation of the present application, but rather the flowcharts illustrate functional information to design or fabricate circuits, generate machine-readable instructions, or use a combination of hardware and machine-readable instructions to perform the illustrated processes.

At 502, a printer network interface of a printing device on which a print job is being received from a client device may be detected to be down. In one example, a check is made to determine whether a pre-defined maximum waiting time is reached. The pre-defined maximum waiting time may be less than a pre-defined time-out before the printer network interface is estimated to be broken. Further, the printer network interface on which the print job is being received may be detected to be down when the maximum waiting time is reached and the printer network interface is not working.

At 504, available network interfaces associated with the client device may be discovered upon detecting that the printer network interface on which the print job is being received is down. In one example, network addresses (e.g., an internet protocol (IP) address or any other mutually acceptable/supported address) associated with each of the available network interface of the client device may be registered with the printing device upon the client device triggering the print job via the printer network interface. Further, the registered available network interfaces associated with the client device are discovered upon detecting that the printer network interface on which the print job is being received is down.

At 506, a link status notification may be sent to the available network interfaces associated with the client device. In one example, the link status notification may include a link status of each of available printer network interfaces associated with the printing device. At 508, the client device may be enabled to connect to the printing device using an alternate printer network interface that is accessible by the client device based on the link status notification.

At 510, the print job may be resumed using the alternate printer network interface. In one example, a printer agent residing in the client device may be enabled to select the alternate printer network interface that is accessible by the client device based on the link status of each of the available printer network interface associated with the printing device. Further, the print job may be resumed using the selected alternate printer network interface that is accessible by the client device.

In another example, other mechanisms based on simple network management protocol (SNMP) traps can be used for communicating printing device-client device notifications. In this case, the client device may be enabled to query the printing device to obtain available printer network interfaces. Further, the client device may be enabled to receive from the printing device the link status notification via a second network protocol upon initiating the print jab via the printer network interface using a first network protocol. Example link status notification that may be sent to the client device may indicates the printer network interface on which the print job is being received is down. The client device may be enabled to select the alternate printer network interface that is accessible by the client device from the available printer network interfaces upon receiving the link status notification. Then the print job may be resumed using the alternate printer network interface that is accessible by the client device.

In this example, the printer agent residing in the client device may register with the printing device's SNMP agent to receive standard SNMP link up/link down traps. The printer agent may register each of network addresses (e.g., IP addresses) associated with the client device with the printing device as a trap recipient. The printer agent can use Internet print protocol (IPP) to query the printing device and obtain a list of the network addresses of the available printer network interfaces of the printing device.

When the printing device detects a link state change, the printer SNMP agent may send an SNMP trap message with the link state (e.g., link up or link down) to the registered trap recipients. When the printer agent receives an SNMP link down trap for a particular printer network interface on which the print job is being received, the printer agent may select an alternate printer network address from the obtained list of network addresses. For example, a standard network interface card (NIC) "Linkup or Linkdown" data can be used for sending the trap event.

The process 500 of FIG. 5 may show example processes and it should be understood that other configurations can be employed to practice the techniques of the present application. For example, process 500 may communicate with a plurality of client devices, and portable devices in a shared networked environment.

Figure 6:
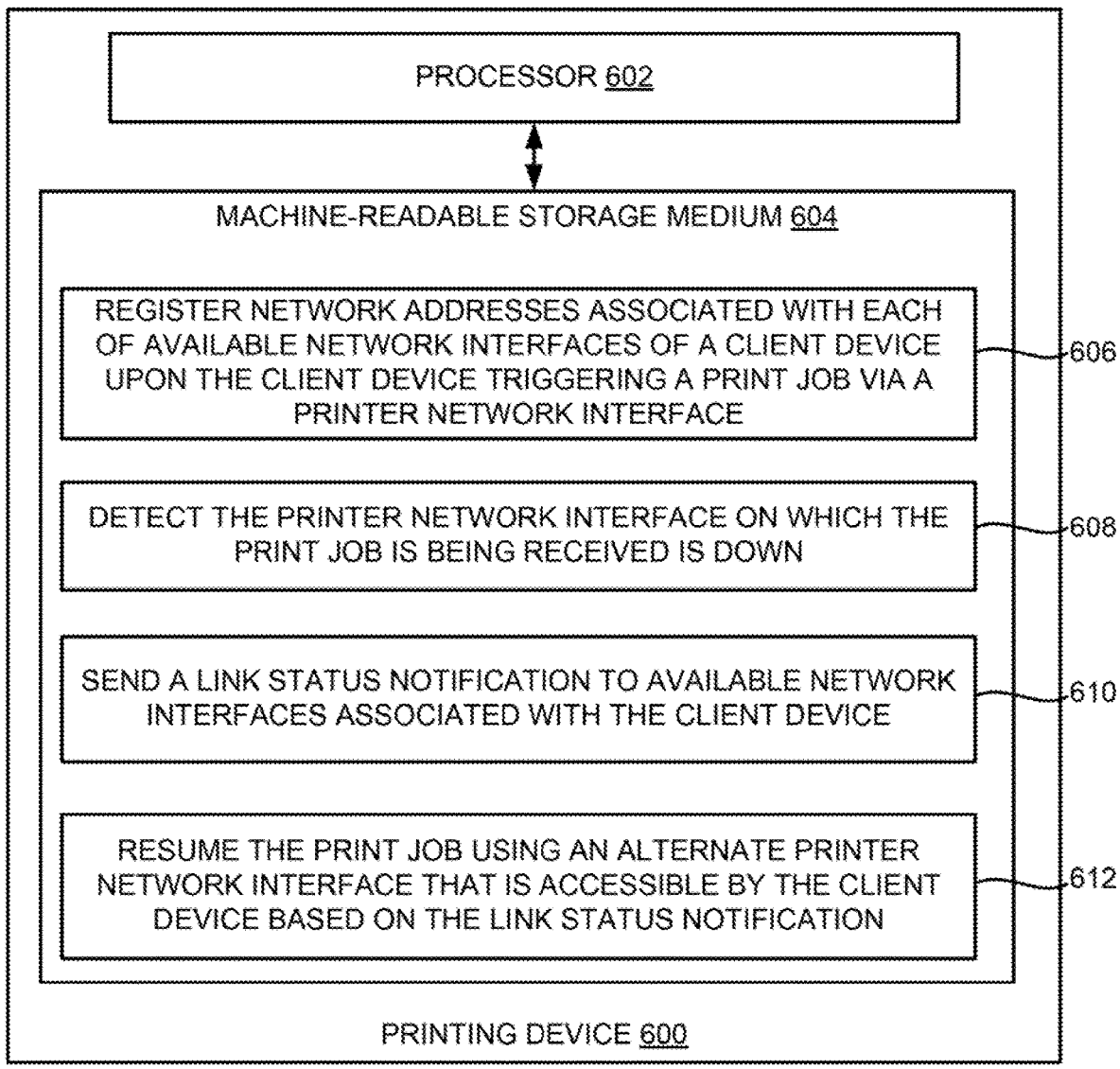
FIG. 6 depicts an example printing device showing a non-transitory computer-readable media to resume a print job using an alternate printer network interface upon detecting a printer network interface on which the print job is being received is down.

FIG. 6 depicts an example printing device 600 showing a non-transitory computer-readable media to resume a print job using an alternate printer network interface upon detecting that a printer network interface on which the print job is being received is down. The printing device 600 may include a processor 602 and a machine-readable storage medium 604 communicatively coupled through a system bus. Processor 602 may be any type of central processing unit (CPU), microprocessor, or processing logic that interprets and executes machine-readable instructions stored in machine-readable storage medium 604. Machine-readable storage medium 604 may be a random access memory (RAM) or another type of dynamic storage device that may store information and machine-readable instructions that may be executed by processor 602. For example, machine-readable storage medium 614 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 604 may be a non-transitory machine-readable medium. In an example, machine-readable storage medium 604 may be remote but accessible to the printing device.

Machine-readable storage medium 604 may store instructions 606-612. In an example, instructions 606-612 may be executed by processor 602 to send a link status notification to a client device and resume a print job using an alternate printer network interface. Instructions 606 may be executed by processor 602 to register network addresses associated with each of available network interfaces of a client device upon the client device triggering a print job via a printer network interface. Instructions 608 may be executed by processor 602 to detect the printer network interface on which the print job is being received is down.

Instructions 610 may be executed by processor 602 to send a link status notification to available network interfaces associated with the client device upon detecting that the printer network interface on which the print job is being received is down. Instructions 612 may be executed by processor 602 to resume the print job using an alternate printer network interface that is accessible by the client device based on the link status notification.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A printing device comprising:
   a network detection unit to discover available network interfaces associated with a client device upon detecting a printer network interface of the printing device on which the printing device is receiving a print job from the client device is down;
   a communication unit to send a link status notification to the client device via the available network interfaces associated with the client device; and
   a network switching unit to resume the print job at the printing device using an alternate printer network interface of the printing device that is accessible by the client device based on the link status notification, such that the printing device continues receiving the print job from the client device on the alternate printer network interface.

2. The printing device of claim 1, wherein the network switching unit is to resume the print job using the alternate printer network interface upon selecting the alternate printer network interface by a printer agent residing in the client device.

3. The printing device of claim 1, comprising:
   a registration unit to register network addresses associated with each of the available network interfaces of the client device upon the client device triggering the print job via the printer network interface, wherein the network detection unit is to discover the registered available network interfaces associated with the client device upon detecting that the printer network interface on which the print job is being received is down.

4. The printing device of claim 1, wherein the link status notification comprises a link status of each of available printer network interfaces associated with the printing device.

5. The printing device of claim 4, wherein the network switching unit is to:
   enable a printer agent residing in the client device to select the alternate printer network interface that is accessible by the client device based on the link status of each of the available printer network interfaces; and
   resume the print job using the selected alternate printer network interface that is accessible by the client device.

6. The printing device of claim 1, wherein each available network interface associated with the client device and each available printer network interface comprise a wired network or a wireless network that uses a network address for communication.

7. A method comprising:
   detecting, by a printing device, a printer network interface of the printing device on which the printing device is receiving a print job from a client device is down;
   discovering, by the printing device, available network interfaces associated with the client device upon detecting that the printer network interface on which the print job is being received is down;
   sending, by the printing device, a link status notification to the available network interfaces associated with the client device;
   enabling, by the printing device, the client device to connect to the printing device using an alternate printer network interface of the printing device that is accessible by the client device based on the link status notification; and
   resuming, by the printing device, the print job at the printing device using the alternate printer network interface of the printing device, such that the printing device continues receiving the print job from the client device on the alternate printer network interface.

8. The method of claim 7, wherein discovering the available network interfaces associated with the client device, comprises:
   registering network addresses associated with each of the available network interface of the client device upon the client device triggering the print job via the printer network interface; and
   discovering the registered available network interfaces associated with the client device upon detecting that the printer network interface on which the print job is being received is down.

9. The method of claim 7, wherein the link status notification comprises a link status of each of available printer network interfaces associated with the printing device.

10. The method of claim 9, wherein resuming the print job using the alternate printer network interface comprises:
enabling a printer agent residing in the client device to select the alternate printer network interface that is accessible by the client device based on the link status of each of the available printer network interface associated with the printing device; and
resuming the print job using the selected alternate printer network interface that is accessible by the client device.

11. The method of claim 7, wherein resuming the print job using the alternate printer network interface comprises:
enabling the client device to query the printing device to obtain available printer network interfaces;
enabling the client device to receive from the printing device the link status notification via a second network protocol upon receiving the print job via the printer network interface using a first network protocol;
enabling the client device to select the alternate printer network interface that is accessible by the client device from the available printer network interfaces upon receiving the link status notification, wherein the link status notification indicates the printer network interface on which the print job is being received is down; and
resuming the print job using the alternate printer network interface that is accessible by the client device.

12. The method of claim 7, wherein detecting the printer network interface on which the print job is being received from the client device is down, comprises:
determining whether a pre-defined maximum waiting time is reached, wherein the pre-defined maximum waiting time is less than a pre-defined time-out before the printer network interface is estimated to be broken; and
detecting the printer network interface on which the print job is being received is down when the maximum waiting time is reached and the printer network interface is not working.

13. A non-transitory machine-readable storage medium comprising instructions executable by a printing device to:
register network addresses associated with each of available network interfaces of a client device upon the client device triggering a print job at the printing device via a printer network interface of the printing device;
detect the printer network interface on which the printing device is receiving the print job is down;
send a link status notification to available network interfaces associated with the client device upon detecting that the printer network interface on which the print job is being received is down; and
resume the print job at the printing device using an alternate printer network interface of the printing device that is accessible by the client device based on the link status notification, such that the printing device continues receiving the print job from the client device on the alternate printer network interface.

14. The non-transitory machine-readable storage medium of claim 13, wherein the link status notification comprises a link status of each of available printer network interfaces associated with a printing device, and wherein each of the available network interfaces associated with the client device and each of the available printer network interfaces comprise a wired network or a wireless network that uses a network address for communication.

15. The non-transitory machine-readable storage medium of claim 13, wherein resuming the print job using the alternate printer network interface comprises:
enabling a printer agent residing in the client device to select the alternate printer network interface that is accessible by the client device using the link status notification; and
resuming the print job using the selected alternate printer network interface.

* * * * *